United States Patent
Arashi

(10) Patent No.: US 9,663,009 B2
(45) Date of Patent: May 30, 2017

(54) CONVEYANCE SEAT

(71) Applicant: TOYOTA BOSHOKU KABUSHIKI KAISHA, Aichi-ken (JP)

(72) Inventor: Masato Arashi, Nagoya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/493,823

(22) Filed: Sep. 23, 2014

(65) Prior Publication Data

US 2015/0091360 A1 Apr. 2, 2015

(30) Foreign Application Priority Data

Sep. 30, 2013 (JP) ................................ 2013-204165

(51) Int. Cl.
| | |
|---|---|
| *B60N 2/66* | (2006.01) |
| *B60N 2/28* | (2006.01) |
| *B60N 2/68* | (2006.01) |
| *B60N 2/02* | (2006.01) |

(52) U.S. Cl.
CPC ............. *B60N 2/682* (2013.01); *B60N 2/028* (2013.01); *B60N 2/66* (2013.01); *B60N 2/667* (2015.04)

(58) Field of Classification Search
CPC ........ B60N 2/028; B60N 2/2209; B60N 2/66; B60N 2/667; B60N 2/682
USPC ............ 297/452.18, 452.55, 452.56, 216.13, 297/216.14, 452.52
See application file for complete search history.

(56) References Cited

U.S. PATENT DOCUMENTS

| | | | | |
|---|---|---|---|---|
| 4,159,847 A | * | 7/1979 | Arai ......................... | B60N 2/66 297/284.4 |
| 5,403,069 A | | 4/1995 | Inara | |
| 5,762,397 A | * | 6/1998 | Venuto ..................... | B60N 2/66 297/284.4 |
| 5,911,477 A | * | 6/1999 | Mundell ................... | B60N 2/66 297/284.4 |
| 6,053,064 A | * | 4/2000 | Gowing .................... | B60N 2/66 29/453 |

(Continued)

FOREIGN PATENT DOCUMENTS

| | | |
|---|---|---|
| CN | 102774295 | 11/2012 |
| CN | 103025571 | 4/2013 |

(Continued)

OTHER PUBLICATIONS

German Official Action for DE102014219173.4 dated Oct. 31, 2014, along with English-language translation thereof.

(Continued)

*Primary Examiner* — Phi A

(74) *Attorney, Agent, or Firm* — Greenblum & Bernstein, P.L.C.

(57) ABSTRACT

A conveyance seat includes a seatback frame disposed in a seatback and supporting an end of a wire member for supporting an occupant in a manner such that the wire member is movable. The seatback frame includes a supporting plane part that the end of the wire member is disposed therein, the supporting plane part being provided along a direction perpendicular to a longitudinal direction of the wire member. A support portion that supports the wire member in a manner such that the wire member is movable is formed in the supporting plane part.

6 Claims, 7 Drawing Sheets

(56) References Cited

U.S. PATENT DOCUMENTS

| | | | |
|---|---|---|---|
| 6,430,801 B1* | 8/2002 | Cosentino | A47C 7/465 29/457 |
| 6,692,074 B1* | 2/2004 | Kopetzky | B60N 2/66 297/284.4 |
| 6,908,153 B2* | 6/2005 | Blendea | A47C 7/465 297/284.4 |
| 6,955,397 B1 | 10/2005 | Humer | |
| 7,131,694 B1* | 11/2006 | Buffa | B60N 2/66 297/284.4 |
| 7,150,502 B2* | 12/2006 | Toba | B60N 2/2356 297/367 R |
| 7,954,899 B2* | 6/2011 | Chen et al. | 297/410 |
| 8,201,886 B2* | 6/2012 | Maierhofer | A47C 7/465 297/284.1 |
| 8,403,272 B2 | 3/2013 | Ohno | |
| 8,439,441 B2 | 5/2013 | Ghisoni et al. | |
| 2004/0021360 A1* | 2/2004 | Key et al. | 297/452.18 |
| 2004/0104609 A1* | 6/2004 | Blendea | A47C 7/465 297/284.4 |
| 2004/0145225 A1* | 7/2004 | Alter | B60N 2/23 297/367 R |
| 2009/0045658 A1 | 2/2009 | Humer et al. | |
| 2011/0215619 A1 | 9/2011 | Kanda et al. | |
| 2012/0112513 A1* | 5/2012 | Mitsuoka et al. | 297/452.18 |
| 2012/0299359 A1 | 11/2012 | Abe | |
| 2013/0341990 A1* | 12/2013 | Muck et al. | 297/452.18 |

FOREIGN PATENT DOCUMENTS

| | | |
|---|---|---|
| DE | 4332399 | 3/1994 |
| DE | 10320371 | 12/2004 |
| DE | 10329852 | 2/2005 |
| DE | 102004050144 | 4/2006 |
| DE | 102009055841 | 6/2011 |
| DE | 102010010604 | 1/2012 |
| DE | 102011083083 | 3/2012 |
| DE | 102012012976 | 1/2014 |
| FR | 2884776 | 10/2006 |
| JP | 09/047336 | 2/1997 |
| JP | 2009-142484 | 7/2009 |
| JP | 2010-90906 | 4/2010 |
| WO | 2009/135684 | 11/2009 |

OTHER PUBLICATIONS

Official Action, along with English-language translation thereof, for CN Appl. No. 201410505290.5 having a mailing date of Apr. 25, 2016.

Official Action, along with English-language translation thereof, in JP Appl. No. 2013-204165 dated Mar. 14, 2017.

* cited by examiner

CONVEYANCE SEAT

INCORPORATION BY REFERENCE

The disclosure of Japanese Patent Application No. 2013-204165 filed on Sep. 30, 2013 including the specification, drawings and abstract is incorporated herein by reference in its entirety.

BACKGROUND OF THE INVENTION

1. Field of the Invention

The present invention relates to a conveyance seat. Particularly, the present invention relates to a support structure of a wire member with respect to a seatback frame in a seatback for supporting a back of a sitting person.

2. Description of Related Art

A seatback constituting a conveyance seat of an automobile or the like supports a back of a sitting person. A framework of the seatback is constituted by a seatback frame. On this account, a seat pad is disposed on a top plate portion provided on that center part of the seatback which supports the back of the sitting person, and a receiving member is disposed on a back side of the seat pad and is supported by the seatback frame. The receiving member is supported by the seatback frame via a wire member, so that a relief movement along with a behavior change of a sitting posture or the like of the sitting person is allowed. In general, such a wire member is supported by an upper frame disposed in an upper part of the seatback frame in a width direction. FIG. 7 schematically illustrates a support structure of a wire member 130 by an upper frame 124 according to U.S. Pat. No. 5,762,397 and Japanese Patent Application Publication No. 2010-90906 (JP 2010-90906 A). The upper frame 124 is generally formed in a flat-plate shape, and a flat plate surface thereof is disposed along an up-down direction. The wire member 130 is disposed so as to face the flat plate surface of the upper frame 124, and a resin clip 146 that supports the wire member 130 in an axially slidable manner is inserted into an attachment hole 144 of the upper frame 124, so that the wire member 130 is attached to the upper frame 124. In this configuration, a supported part of the wire member 130 by the resin clip 146 is configured such that an axial allowable movement of the wire member 130 is secured sufficiently. Accordingly, it is possible to perform a relief movement of the wire member 130 along with a behavior change of the sitting person without any trouble.

SUMMARY OF THE INVENTION

In the meantime, as illustrated in FIG. 8, in order to increase rigidity of the whole seatback frame, the upper frame 124 is formed to have a hat-shaped section these days. In a case where the wire member 130 is supported by the upper frame 124 having the hat-shaped section, when the wire member 130 is supported according to an idea of the above supporting method, the wire member 130 is supported, via the resin clip 146, by a flange portion 142 having a flat surface disposed in an up-down direction on a lower side of the hat-shaped section. However, in a case of such a support structure of the wire member 130, a lateral part 138 that is continued to the flange portion 142 so as to be bent toward the flange portion 142 on the lower side of the hat-shaped section is placed right above the wire member 130. Therefore, at the time when the wire member 130 axially moves, particularly, moves upward, an upper end of the wire member 130 abuts with the lateral part 138, so that the movement of the wire member 130 is prevented. That is, such a problem is caused that a relief movement of the wire member 130 along with a behavior change of the sitting person cannot be secured sufficiently. In fact, in order to solve this problem, there is such a method in which a movable gap between the upper end of the wire member 130 and the lateral part 138 is set large. However, in this case, it is necessary to set a support position by the resin clip 146 in a lower position, which causes such a necessity that the flange portion 142 is extended downward unnecessarily. Further, since the support position of the wire member 130 by the resin clip 146 is set in the lower position, support performance for supporting the sitting person may be affected. Thus, another problem occurs.

The present invention provides a conveyance seat configured such that, in a case where a wire member is supported by a seatback frame in an axially movable manner, even if the seatback frame is placed in a position where the seatback frame disturbs the axial movement of the wire member, it is possible to support the wire member in an axially movable manner by the seatback frame placed in such a position.

A conveyance seat according to an aspect of the present invention includes: a seatback frame disposed in a seatback and supporting an end of a wire member for supporting an occupant in a manner such that the wire member is movable. The seatback frame includes a supporting plane part that the end of the wire member is disposed therein, the supporting plane part being provided along a direction perpendicular to a longitudinal direction of the wire member, and a support portion that supports the wire member in a manner such that the wire member is movable is formed in the supporting plane part. Note that, in the above aspect, the support section may be a through hole. Further, a resin clip may be fitted to the through hole, so that the wire member is movably supported by the resin clip.

According to the above aspect, the seatback frame in a position where the wire member is movable, that is, the seatback frame including the supporting plane part provided along the direction perpendicular to the longitudinal direction of the wire member And configured such that the wire member is movably disposed is configured such that the wire member is movably supported by a support portion. This makes it possible to perform a relief movement of the wire member along with a behavior change of a sitting person without any trouble. Note that, if the support portion is a through hole, it is possible to obtain the configuration easily. Further, when the resin clip is fitted to the through hole so as to support the wire member in an axially movable manner, it is possible to achieve a smooth axial movement of the wire member with a small resistance.

According to the above aspect, in a case where the wire member is supported by the seatback frame in an axially movable manner, even if the seatback frame is placed in a position where the seatback frame disturbs the axial movement of the wire member, it is possible to support the wire member in an axially movable manner by the seatback frame placed in such a position.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
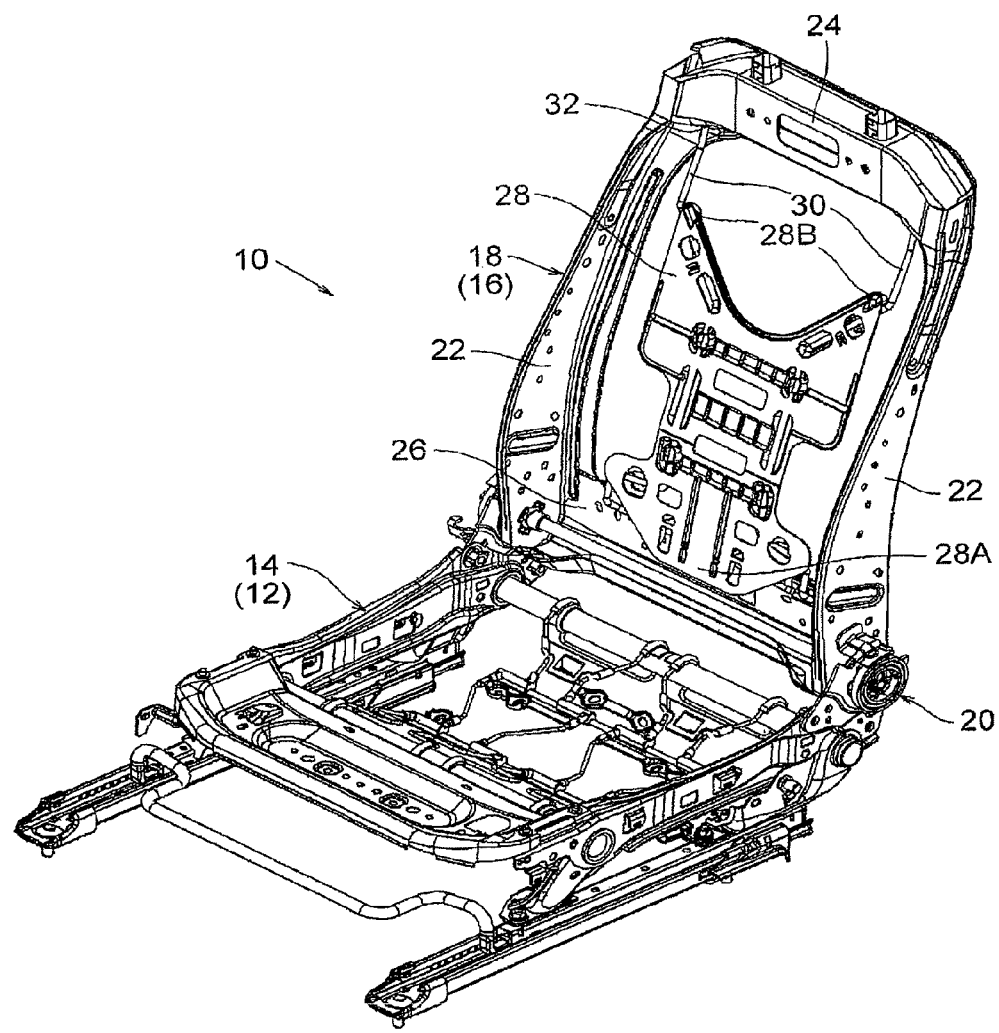
FIG. 1 is a perspective view illustrating a seat frame framework of a conveyance seat according to an embodiment.
Figure 2:
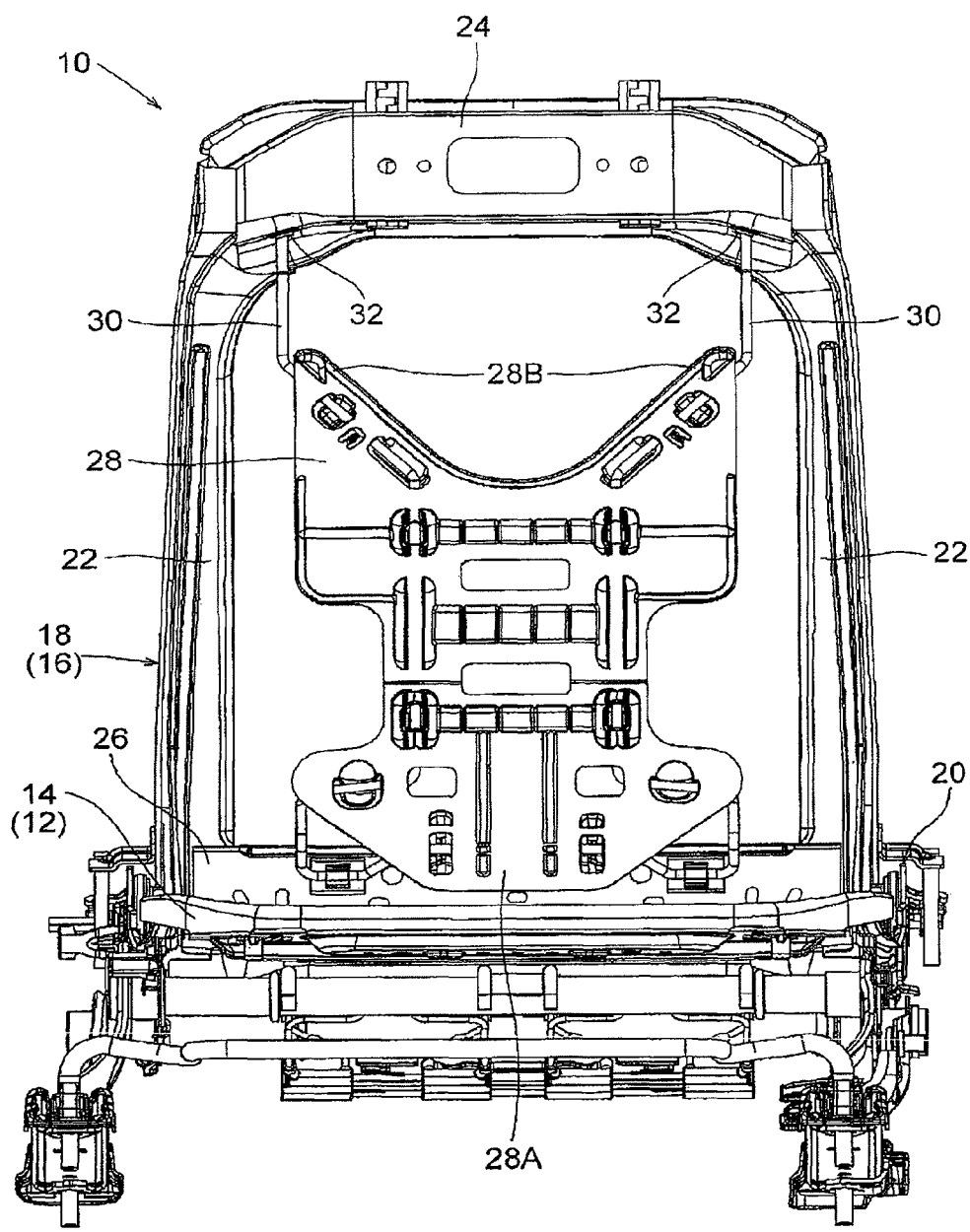
FIG. 2 is a front view illustrating the seat frame framework of the conveyance seat illustrated in FIG. 1.

The following describes an embodiment of the present invention with reference to the drawings. Note that, in the following description, directions indicative of top and bottom sides, right and left sides, front and rear sides, and the like indicate directions viewed from a sitting person sitting on a seat. FIGS. 1 and 2 illustrate a seat frame framework of a conveyance seat 10 (hereinafter just referred to as "seat 10") represented by an automobile. The seat 10 is mainly constituted by a seat cushion 12 serving as a seat for a sitting person, a seatback 16 serving as a backrest, and a headrest (not shown) that supports a head. The seat cushion 12 and the seatback 16 respectively include a seat cushion frame 14 and a seatback frame 18, which form respective frameworks thereof. A reclining mechanism 20 is provided in a connection portion between the seat cushion 12 and the seatback 16, thereby allowing the seatback 16 to tilt in a front-rear direction.

The seatback frame 18 of the seatback 16 is constituted by right and left side frames 22, an upper frame 24 that connects upper parts of the side frames 22 with each other, and a lower frame 26 that connects lower parts of the side frames 22 with each other. The seatback frame 18 is formed in a frame shape, and forms a framework that defines an outer shape of the seatback 16. Further, a seat pad (not shown) is disposed in the seatback 16 so as to wrap up the seatback frame 18, and a seat cover is provided so as to cover an outer surface of the seat pad. Thus, the seatback 16 is configured to support a back of the sitting person. A contour mat 28 serving as a receiving member for receiving the seat pad is disposed on a back side of the seat pad. A lower end 28A of the contour mat 28 is locked to the lower frame 26, upper ends 28B are supported by the upper frame 24 via wire members 30 in a movable manner in the up-down direction. The contour mat 28 receives, via the seat pad, a behavior change load along with a change in a sitting posture or the like of the sitting person as a load in the front-rear direction. Due to the load, the contour mat 28 is going to move in the front-rear direction. At this time, since the lower end 28A of the contour mat 28 is locked to the lower frame 26 and serves as a supporting point, the movement of the contour mat 28 is performed such that those parts 32 of the upper ends 28B which are supported by the upper frame 24 via the wire members 30 are supported in a movable manner in the up-down direction.

Figure 3:
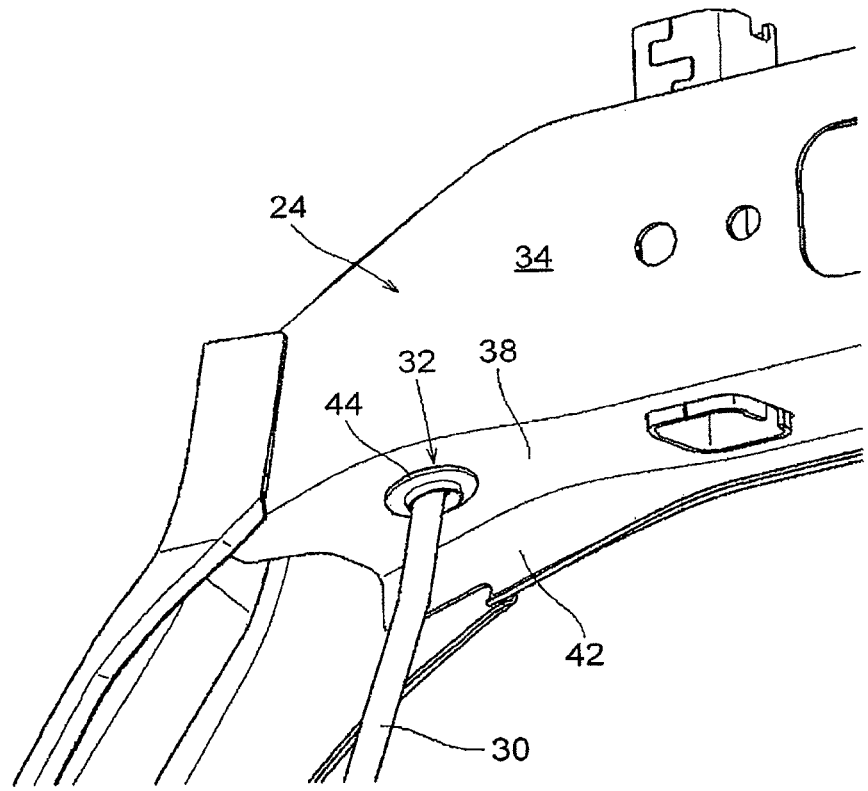
FIG. 3 is an enlarged perspective view illustrating an area where the wire member is supported by an upper frame of the seatback frame.
Figure 4:
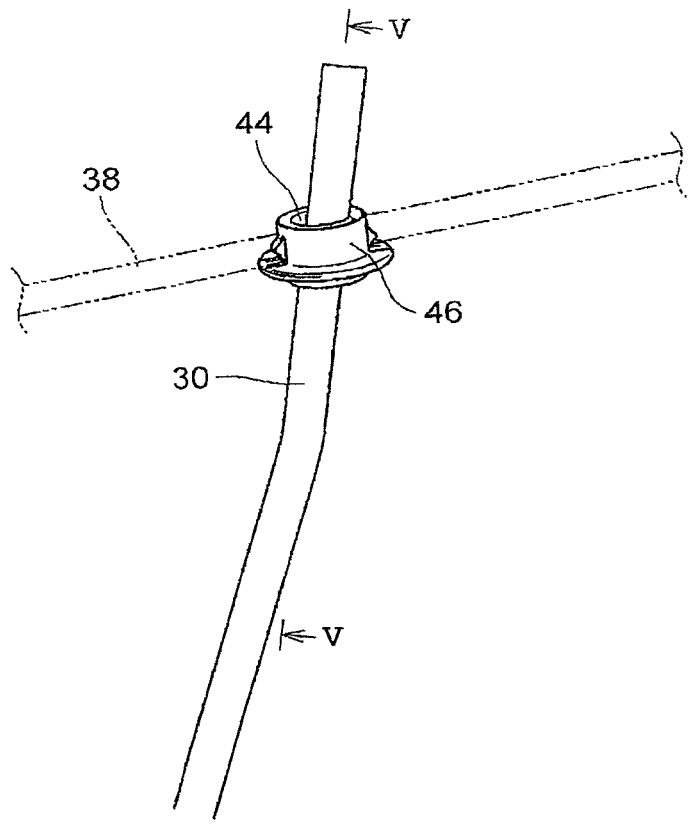
FIG. 4 is a view illustrating a placement relationship between the wire member and a resin clip.
Figure 5:
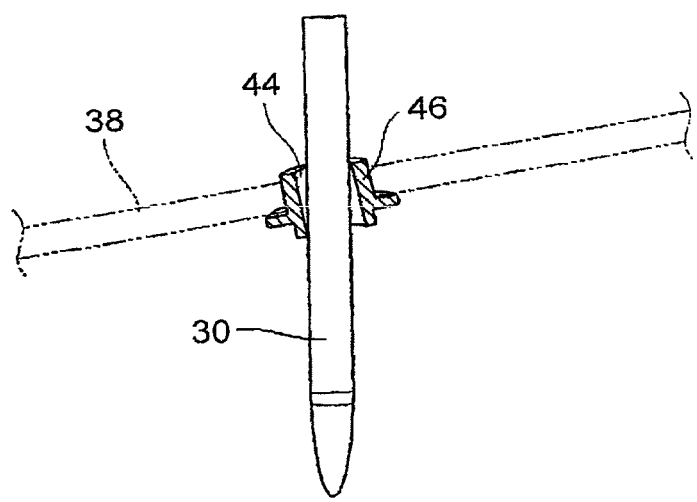
FIG. 5 is a sectional view taken along a line V-V in FIG. 4.

FIG. 3 is an enlarged view of the part 32 in which the wire member 30 is supported by the upper frame 24. In order to increase rigidity of the upper frame 24, the upper frame 24 is formed to have a hat-shaped section. The upper frame 24 is placed in such a placement relationship that an opening of the hat-shaped section faces a rear side. As illustrated in a schematic view of FIG. 6, the hat-shaped section of the upper frame 24 includes an upright part 34, an upper lateral part 36, and a lower lateral part 38. Further, flange portions 40, 42 are provided in the upper and lower lateral parts 36, 38, respectively, such that the flange portions 40, 42 are bent from the upper and lower lateral parts 36, 38 in an extending manner. The wire member 30 is supported by the lower lateral part 38 as illustrated in FIG. 3. The lower lateral part 38 corresponds to a seatback frame of the present invention which seatback frame includes a supporting plane part provided along a direction perpendicular to a moving direction of the wire member 30, that is, a longitudinal direction thereof. A through hole 44 is formed in the lower lateral part 38, and an axial end part of the wire member 30 is inserted into the through hole 44 so that the wire member 30 is supported in an axially movable manner. As clearly illustrated in FIGS. 4, 5, a resin clip 46 having a generally cylindrical shape is fitted to the through hole 44, so that the wire member 30 is supported via the resin clip 46. The resin clip 46 allows the wire member 30 to be supported with a small sliding friction, thereby allowing the wire member 30 to smoothly move in the up-down direction.

Figure 6:
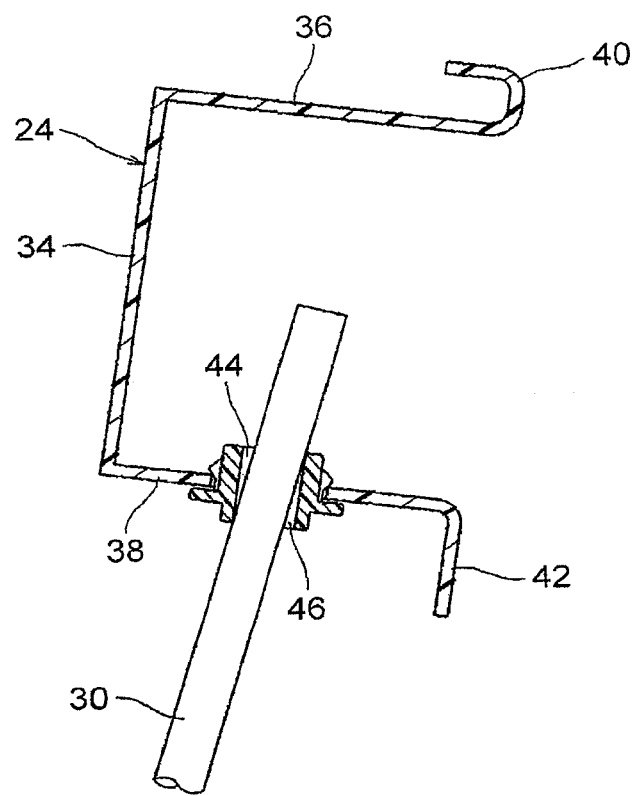
FIG. 6 is a schematic view illustrating a support structure of the wire member with respect to the upper frame, according to the embodiment.
Figure 7:
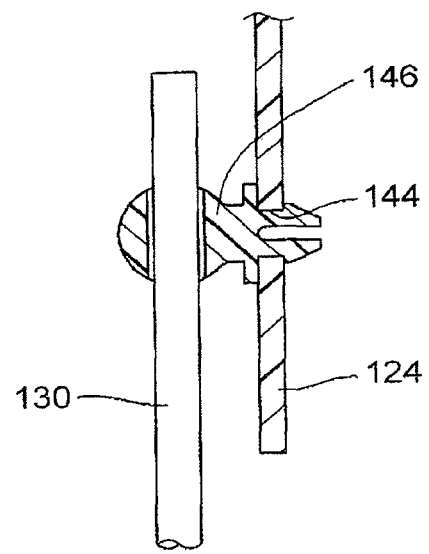
FIG. 7 is a schematic view illustrating a support structure of a wire member with respect to an upper frame, according to a related art.
Figure 8:
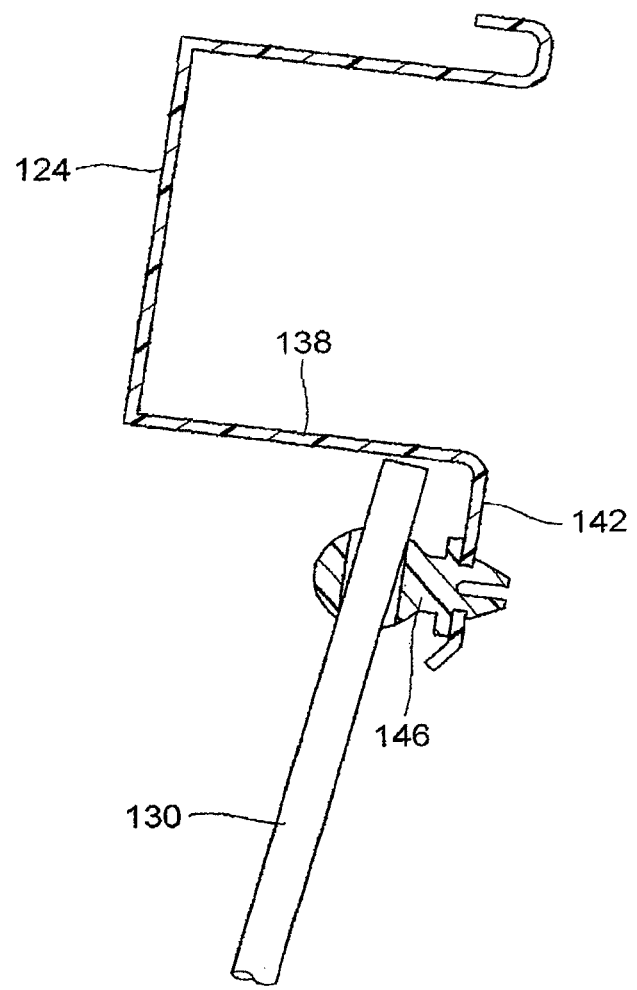
FIG. 8 is a schematic view in a case where the wire member is supported by the upper frame having a hat-shaped section, according to a method illustrated in FIG. 7.

FIG. 6 schematically illustrates a configuration in which the wire member 30 in the present embodiment is supported by the upper frame 24. As can be seen from FIG. 6, the wire member 30 is supported in an axially movable manner by the lower lateral part 38 of the hat-shaped section of the upper frame 24. Any member that disturbs the movement is not provided in a range in which a relief movement of the wire member 30 is required along with a change in a sitting posture or the like of the sitting person, which allows the wire member 30 to perform the relief movement successfully. That is, there is a sufficient space for the relief movement between the lower lateral part 38 and the upper lateral part 36 of the hat-shaped section of the upper frame 24, so that the movement is not disturbed. In the present embodiment, even in a case where the wire member 130 is supported by the upper frame 24 having the hat-shaped section, the support can be performed with an extremely simple configuration, without increasing the number of components in comparison with a related art.

Thus, the present embodiment yields a large practical value.

The embodiment of the present invention has been described above, but the present invention is performable in various embodiments other than the above embodiment. For example, a shape of the through hole as a support portion is selected appropriately, and may be a round hall or a square hole. Further, it is not necessary to fit the resin clip to the through hole. However, in order to achieve a smooth axial movement of the wire member with a small resistance, it is preferable that a low friction material component such as the resin clip be fitted to the through hole. In this viewpoint, felt or the like may be used other than the resin clip. Further, a sectional shape of the upper frame is not limited to the hat-shaped section shape, and various sectional shapes can be employed. In short, the present invention is applicable to any seatback frame provided that a movable end of the wire member is disposed in the seatback frame and the seatback frame includes a supporting plane part provided along a direction perpendicular to the longitudinal direction of the wire member. For example, an upper frame having a double hat-shaped section formed by connecting hat-shaped sections may be used.

What is claimed is:

1. A conveyance vehicle seat comprising:
    a wire member; and
    a seatback frame disposed in a seatback, the seatback frame including an upper frame that connects upper parts of side frames and that supports an end of the wire member such that the seatback frame and the wire member are configured to support a rearward force, the upper frame including:
        an upper lateral part;
        a lower lateral part; and
        an upright part that directly connects the upper lateral part and the lower lateral part in an up-down direction of the seatback frame, wherein
    the lower lateral part defines a supporting plane part that the end of the wire member extends through such that the end of the wire member is disposed within an inside of the seatback frame defined between the upper lateral part, the lower lateral part, and the upright part,
    the supporting plane part is provided along a direction perpendicular to a longitudinal direction of the wire member,
    a support portion is defined in the supporting plane part and supports the wire member such that the end of the wire member is freely disposed within the inside of the seatback frame so as to be movable in the up-down direction,
    the upright part is disposed forward relative to the end of the wire member in a forward-rearward direction of the vehicle seat so as to define a forward side of the seatback frame that the end of the wire member is disposed within, and
    the upper lateral part, the lower lateral part, and the upright part define a C-shape when viewed in a cross-section of the seatback frame.

2. The conveyance vehicle seat according to claim 1, wherein
    the support portion is a through hole.

3. The conveyance vehicle seat according to claim 1, wherein
    a resin clip is fitted to a through hole so that the wire member is movably supported by the resin clip.

4. The conveyance vehicle seat according to claim 2, wherein
    a resin clip is fitted to the through hole so that the wire member is movably supported by the resin clip.

5. The conveyance vehicle seat according to claim 1, wherein
    the support portion is a through hole.

6. The conveyance vehicle seat according to claim 5, wherein
    a resin clip is fitted to the through hole so that the wire member is movably supported by the resin clip.

* * * * *